US008762229B1

(12) United States Patent
Hernacki et al.

(10) Patent No.: US 8,762,229 B1
(45) Date of Patent: Jun. 24, 2014

(54) PARENTAL POLICY BASED ONLINE WISH LISTS

(75) Inventors: Brian Hernacki, Mountain View, CA (US); Bruce McCorkendale, Manhattan Beach, CA (US); Shaun Cooley, El Segundo, CA (US)

(73) Assignee: Symantec Corporation, Mountain View, CA (US)

( * ) Notice: Subject to any disclaimer, the term of this patent is extended or adjusted under 35 U.S.C. 154(b) by 388 days.

(21) Appl. No.: 11/959,439

(22) Filed: Dec. 18, 2007

(51) Int. Cl.
*G06Q 30/00* (2012.01)

(52) U.S. Cl.
USPC ............. 705/26.8; 705/26.1; 705/26.82

(58) Field of Classification Search
USPC ..................... 705/26, 27, 26.1–27.2
See application file for complete search history.

(56) References Cited

U.S. PATENT DOCUMENTS 6,101,482 A * 8/2000 DiAngelo et al. ............. 705/26
6,850,899 B1 * 2/2005 Chow et al. .................. 705/26
2002/0152135 A1 * 10/2002 Beeri et al. ................... 705/27
2006/0069627 A1 * 3/2006 Petersen et al. ............. 705/27

OTHER PUBLICATIONS

Editors, B. (Aug. 30, 1999). iCanBuy.com is the only teen and kid E-commerce site to earn BBBOnLine seal; privacy protection seal granted to iCanBuy.com for outstanding privacy and security. Business Wire.*

* cited by examiner

*Primary Examiner* — Resha Desai
(74) *Attorney, Agent, or Firm* — Brill Law Office; Jeffrey Brill

(57) ABSTRACT

A parental policy is enforced for online purchases. A parent enters a parental policy indicating items that are prohibited for a child. When the child attempts to add an item to a wish list, it is determined whether the item is permitted according to the policy. If so, the addition of the item to the wish list is allowed to proceed. If the policy prohibits the item, the addition of the item to the wish list is blocked. Additionally, the parent can be informed (via email, telephone, etc.) of the attempt to add the item to the wish list. The same logic can be applied to attempts to purchase items for children, or attempts to purchase items by children.

21 Claims, 2 Drawing Sheets

PARENTAL POLICY BASED ONLINE WISH LISTS

TECHNICAL FIELD

This invention pertains generally to online wish list based commerce, and more specifically to enabling parents to ensure that items that their children add to a wish list comply with a parental policy.

BACKGROUND

Many people use online wish lists to facilitate gift giving. Especially in families that are geographically distributed, referring to online wish lists is a convenient way to select and give gifts that are of specific interest to the receiving party. Individuals maintain online wish lists specifying items that they would like to receive. Typically, these items are available for purchase online, through the wish list. Those who would like to purchase a gift for a party with an online wish list can simply select an item from the list for online purchase. They are ensured of selecting a gift the receiving party actually wants and does not yet have, as the receiving party put the item on the list. When an item is purchased from the list, that item is typically automatically removed, to avoid duplicate purchases of the same item.

Of course, children are often given gifts. Children today often manage their own online wish lists. When children add items to their wish lists, they often add items that their parents have not approved, and do not want them to have. For example, suppose a child sees an advertisement for a BB gun and ads it to his wish list. The child's grandparents could then purchase the BB gun as a gift for the child's birthday. This type of scenario can create a non-optimal situation whenever a gift purchased for a child conflicts with parental policy. While such gifts can often be returned and exchanged, this requires extra work for the parents, delay for the child, and often some amount of conflict between the two. On the other hand, if parents manage wish lists for their children, the items that the parents add will often not be of genuine interest to the children.

It would be desirable to limit a child's online wish list to those items that are both selected by the child and in compliance with parental policy.

SUMMARY

A parental policy is enforced for online purchases. A parent enters a parental policy indicating items that are prohibited for a child. When the child attempts to add an item to a wish list, it is determined whether the item is permitted according to the policy. If so, the addition of the item to the wish list is allowed to proceed. If the policy prohibits the item, the addition of the item to the wish list is blocked. Additionally, the parent can be informed (via email, telephone, etc.) of the attempt to add the item to the wish list. The same logic can be applied to attempts to purchase items for children, or attempts to purchase items by children.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The Figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
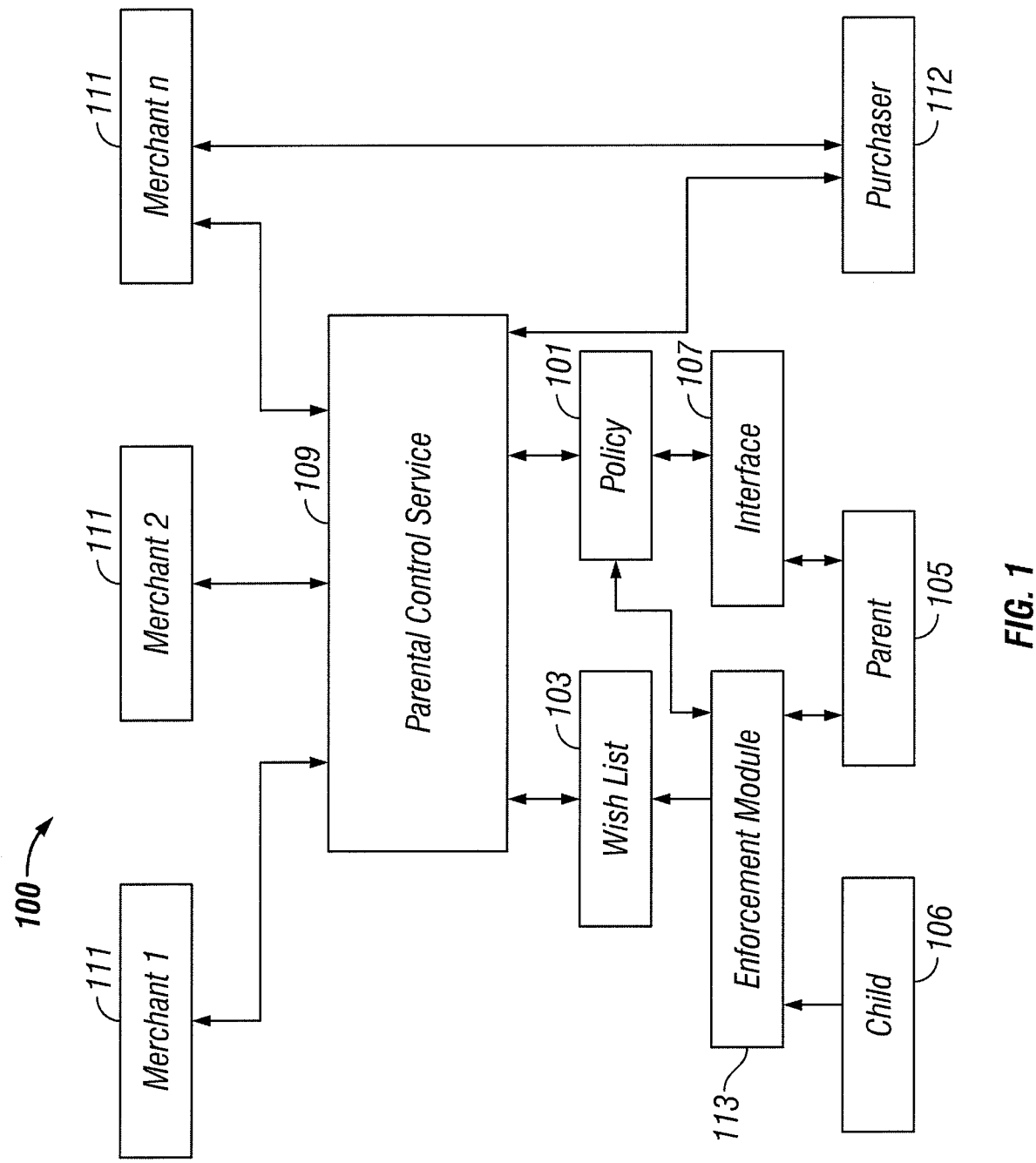
FIG. 1 is a block diagram illustrating a system in which a parental policy is applied to a wish list, according to some embodiments of the present invention.

FIG. 1 illustrates a system 100 in which a parental policy 101 is applied a wish list 103, according to some embodiments of the present invention. It is to be understood that although various components are illustrated in FIG. 1 as separate entities, each illustrated component represents a collection of functionalities which can be implemented as software, hardware, firmware or any combination of these. Where a component is implemented as software, it can be implemented as a standalone program, but can also be implemented in other ways, for example as part of a larger program, as a plurality of separate programs, as a kernel loadable module, as one or more device drivers or as one or more statically or dynamically linked libraries.

As illustrated, a parent or guardian 105 specifies their gift policy 101. As illustrated, parents 105 can enter policy information 101 through a parent interface module 107, which can be in the form of any user interface that allows a parent 105 to enter policy data 101. In one embodiment, the parent interface module 107 is in the form of a web site. In another example, the parent interface module 107 is in the form of an interface to an application running on a local computer system. The parent interface module 107 stores entered information 101 (e.g., the parental gift policy) either locally or remotely. Of course, the parent interface module 107 allows parents 105 to edit previously entered policy data 101. In some embodiments, default policy data 101 is provided, which parents 105 can delete and/or edit. In some embodiments, parents 105 can enter policy data 101 in other ways, such as via a command line or configuration file (not illustrated).

As with other parental control schemes, parents 105 may wish to create a policy 101 for a specific item (e.g., "a subscription to a specific magazine is prohibited"). More commonly, parents 105 choose to set more general policies 101 based on categories. Thus, the parent interface module 107 allows the categorization of items. Some items, such as movies and video games, have rating systems that can be used for categorization (e.g., a parental policy can state "no R rated movies", "only rated E videogames", etc.). Other categorizations can be suggested by the interface (e.g., in seeded menus or other user interface components) or input by parents 105 (e.g., "no toy weapons", "no noisy toys"). Once a parent 105 has defined a policy 101 for a given child 106, that policy 101 can be applied in a variety of ways.

As illustrated in FIG. 1, when a child 106 attempts to add an item to his wish list 103, a policy enforcement module 113 enforces the corresponding parental policy 101. This can take a variety of forms as desired. In one embodiment, whenever a child 106 attempts to add an item to a wish list 103, the policy enforcement module 113 determines whether the item is prohibited by the parental policy 101, and if so blocks the entry of the item (or alternatively allows the entry of the item, but blocks the list from exposing it). Thus, the policy enforcement module 113 ensures that only items that are not prohibited are on the wish list 103. It is also possible that when a child 106 attempts to add a prohibited item, the policy enforcement module 113 informs the parent 105 (e.g., via email, instant message, telephone, etc.), with our without adding the item to the wish list 103 as desired. The policy enforcement module 113 can also prompt the parents 105 for approval in response to attempts to add prohibited items, thus giving the parent 105 the option of overriding the policy 101. The parental policy 101 and the default behaviors of the policy enforcement module 113 can be defined with any level of granularity, including but not limited to any combination of the behaviors described above.

In some embodiments, a child's wish list 103 is managed by a parental control service 109. In these embodiments, all wish list 103 based ordering is done through this service 109, which then facilitates the e-commerce with the actual merchants 111 which provide the items on the wish list 103 (like the way in which Amazon fronts other merchants 111). Even where some merchants 111 are not fronted by the parental control service 109, purchasers 112 can still read the wish list 103 as published by the parental control service 109, and thus glean guidance in their decisions regarding purchases from those merchants 111. The parental control service 109 can also provide the wish list 103 and/or parental policy 101 to third party merchants 111, which can then provide wish list 103 based ordering in compliance with the parental policy 101.

As will be apparent to those of ordinary skill in the relevant art in light of this specification, the parental control service 109 (or a non-fronted merchant 111 receiving policy 101 data therefrom) can determine whether an attempt to purchase an item for a child 105 complies with the parental policy 101, independently of the white list 103 integrity protocol described above. In some embodiments, the parental control service 109 determines whether attempts to purchase items from a wish list 103 for a child 105 comply with the parental policy 101. If the item is permitted according to the policy 101, the parental control service 109 allows the purchase to proceed. If the policy 101 prohibits the purchase of the item for the child 105, the parental control service 109 blocks the purchase attempt, and/or takes other appropriate actions as desired. This logic can be applied in addition to and/or instead of the wish list 103 integrity logic, as desired.

Figure 2:
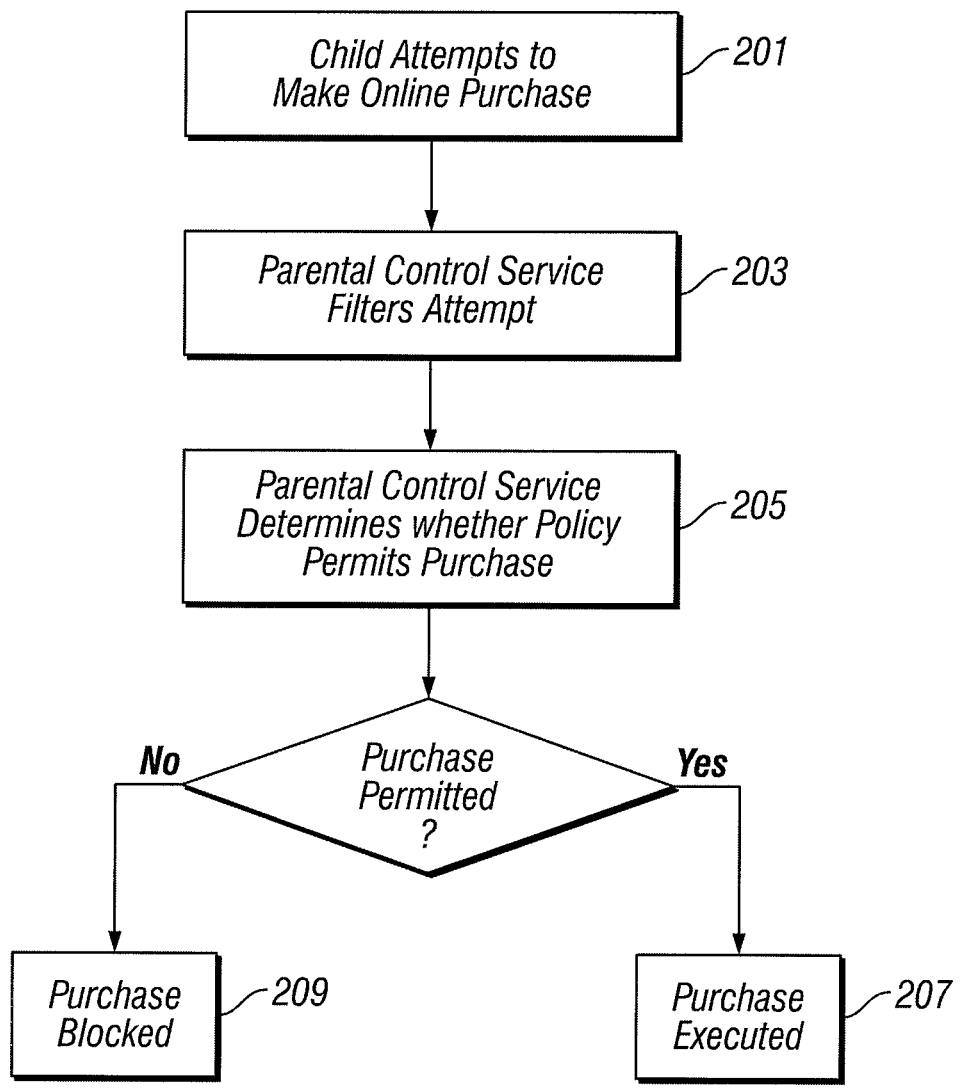
FIG. 2 is a flowchart illustrating steps for applying a parental policy to online purchases independently of a wish list, according to some embodiment of the present invention.

It is to be understood that the item restriction policy 101 can be applied beyond wish list 103 based ordering, to general online purchasing. As children are provisioned with digital money, some parents 105 may wish to specify an enforced policy 101 governing how it is spent. Embodiments of the present invention can provide such functionalities beyond the context of wish lists 103. FIG. 2 illustrates steps for such enforcement, according to some embodiments of the present invention. A child 106 attempts 201 to make an online purchase. All online purchase attempts are filtered 203 by a parental control service 109. In other embodiments, non-fronted merchants 111 receive a parental policy 101 from the parental control service 109 and enforce it directly (not illustrated in FIG. 2). The parental control service 109 determines 205 whether the item the child 105 is attempting to purchase is permitted according to the policy 101. If so, the purchase is executed 207. If the policy 101 prohibits the purchase of the item, the purchase attempt is blocked 209.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies and other aspects are not mandatory or significant, and the mechanisms that implement the invention or its features may have different names, divisions and/or formats. Furthermore, as will be apparent to one of ordinary skill in the relevant art, the portions, modules, agents, managers, components, functions, procedures, actions, layers, features, attributes, methodologies and other aspects of the invention can be implemented as software, hardware, firmware or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment. Furthermore, it will be readily apparent to those of ordinary skill in the relevant art that where the present invention is implemented in whole or in part in software, the software components thereof can be stored as program code (for example as object code or executable images) on computer readable storage media as computer program products (articles of manufacture). As will be readily apparent to those of ordinary skill in the relevant art, any form of tangible computer readable storage medium can be used in this context, such as magnetic or optical storage media. Additionally, it will be readily apparent to those of ordinary skill in the relevant art that software components of the present invention can be instantiated as program code (for example as object code or executable images) within the memory of any programmable computing device, such that when the processor of the computing device processes the components, the computing device executes their associated functionality. It will be further readily apparent to those of ordinary skill in the relevant art that the terms "computer system" and "computing device" means one or more computers configured and/or programmed to execute the described functionality. Accordingly, the disclosure of the present invention is intended to be illustrative, but not limiting, of the scope of the invention, which is set forth in the following claims.

What is claimed is:

1. A computer implemented method for enforcing a parental policy for online purchases, the method comprising the steps of:

receiving, by a computer, a single parental policy indicating items prohibited for a child, said received single policy being automatically applicable to attempts to facilitate electronic purchases from any source, using a single wish list, by any party, for the benefit of the child;

receiving, by a computer, multiple attempts to facilitate individual purchases from multiple ones of a plurality of online merchants, using the single wish list, for the benefit of the child;

for each attempt to facilitate an individual purchase, 1) determining, by a computer, whether the purchase is permitted according to the policy, and 2) automatically affecting, by a computer, the attempt to facilitate the purchase responsive to results of the determining step; and in response to determining that a specific attempt to facilitate an individual purchase of a specific item is not permitted according to the policy, 1) blocking the addition of the item to the wish list, and 2) transmitting a communication to the parent indicating that an unsuccessful attempt was made to add the item to the wish list.

2. The method of claim 1 wherein receiving, by a computer, an attempt to make a purchase for the benefit of the child further comprises:
   receiving, by a computer, an attempt by the child to add an item to a wish list.

3. The method of claim 2 wherein affecting, by a computer, the attempt to facilitate the purchase responsive to results of the determining step further comprises:
   determining, by a computer, that the attempt by the child to add the item to the wish list is not permitted according to the policy; and
   responsive to the determination, performing, by a computer, at least one step from a group of steps consisting of:
      blocking, by a computer, the addition of the item to the wish list;
      blocking, by a computer, the wish list from exposing the entry of the item;
      transmitting, by a computer, a communication to the parent indicating that the child is attempting to add the item to the wish list;
      transmitting, by a computer, a communication to the parent requesting a parental directive as to a desired course of action; and
      responsive to receiving an indication from the parent indicating to override the policy, allowing, by a computer, the addition of the item to the wish list.

4. The method of claim 1 wherein receiving, by a computer, an attempt to make a purchase for the benefit of the child further comprises:
   receiving, by a computer, a request by a third party to purchase an item from a wish list for the child.

5. The method of claim 1 wherein receiving, by a computer, an attempt to make a purchase for the benefit of the child further comprises:
   receiving, by a computer, a request from the child to purchase an item.

6. The method of claim 1 wherein automatically affecting the attempt to facilitate the purchase responsive to results of the determining step further comprises:
   automatically determining, by a computer, that the attempt to facilitate the purchase is not permitted according to the policy; and
   responsive to the determination, automatically performing, by a computer, at least one step from a group of steps consisting of:
      blocking, by a computer, the attempt to facilitate the purchase;
      transmitting, by a computer, a communication to the parent indicating that the attempt is being made;
      transmitting, by a computer, a communication to the parent requesting a parental directive as to a desired course of action; and
      responsive to receiving an indication from the parent indicating to override the policy, allowing, by a computer, the facilitation of the purchase to proceed.

7. The method of claim 1 wherein affecting, by a computer, the attempt to facilitate the purchase responsive to results of the determining step further comprises:
   determining, by a computer, that the attempt to facilitate the purchase is permitted according to the policy; and
   responsive to the determination, performing, by a computer, at least one step from a group of steps consisting of:
      executing, by a computer, the purchase of the item; and
      forwarding, by a computer, relevant data to an online merchant to facilitate purchase of the item.

8. The method of claim 1 further comprising:
   forwarding, by a computer, the parental policy to an online merchant for enforcement.

9. The method of claim 1 wherein receiving, by a computer, a parental policy indicating items prohibited for a child further comprises:
   receiving, by a computer, a parental policy specifying item categories which are prohibited for the child.

10. At least one non-transitory computer-readable storage medium storing a computer program product for enforcing a parental policy for online purchases, the computer program product comprising:
    program code for receiving a single parental policy indicating items prohibited for a child, said received single policy being automatically applicable to attempts to facilitate electronic purchases, from any source, using a single wish list, by any party, for the benefit of the child;
    program code for receiving multiple attempts to facilitate individual purchases from multiple ones of a plurality of online merchants, using the single wish list, for the benefit of the child;
    program code for, for each attempt to facilitate an individual purchase, 1) determining whether the purchase is permitted according to the policy, and 2) automatically affecting the attempt to facilitate the purchase responsive to results of the determining step; and
    program code for, in response to determining that a specific attempt to facilitate an individual purchase of a specific item is not permitted according to the policy, 1) blocking the addition of the item to the wish list, and 2) transmitting a communication to the parent indicating that an unsuccessful attempt was made to add the item to the wish list.

11. The computer program product of claim 10 wherein the program code for receiving an attempt to make a purchase for the benefit of the child further comprises:
    program code for receiving an attempt by the child to add an item to a wish list.

12. The computer program product of claim 11 wherein the program code for affecting the attempt to facilitate the purchase responsive to results of the determining step further comprises:
    program code for determining that the attempt by the child to add the item to the wish list is not permitted according to the policy; and
    program code for, responsive to the determination, performing at least one step from a group of steps consisting of:
       blocking the addition of the item to the wish list;
       blocking the wish list from exposing the entry of the item;
       transmitting a communication to the parent indicating that the child is attempting to add the item to the wish list;
       transmitting a communication to the parent requesting a parental directive as to a desired course of action; and
       responsive to receiving an indication from the parent indicating to override the policy, allowing the addition of the item to the wish list.

13. The computer program product of claim 10 wherein the program code for receiving an attempt to make a purchase for the benefit of the child further comprises:
   program code for receiving a request by a third party to purchase an item from a wish list for the child.

14. The computer program product of claim 10 wherein the program code for receiving an attempt to make a purchase for the benefit of the child further comprises:
   program code for receiving a request from the child to purchase an item.

15. The computer program product of claim 10 wherein the program code for affecting the attempt to facilitate the purchase responsive to results of the determining step further comprises:
   program code for determining that the attempt to facilitate the purchase is not permitted according to the policy; and
   program code for, responsive to the determination, performing at least one step from a group of steps consisting of:
      blocking the attempt to facilitate the purchase;
      transmitting a communication to the parent indicating that the attempt is being made;
      transmitting a communication to the parent requesting a parental directive as to a desired course of action; and
      responsive to receiving an indication from the parent indicating to override the policy, allowing the facilitation of the purchase to proceed.

16. The computer program product of claim 10 wherein the program code for affecting the attempt to facilitate the purchase responsive to results of the determining step further comprises:
   program code for determining that the attempt to facilitate the purchase is permitted according to the policy; and
   program code for, responsive to the determination, performing at least one step from a group of steps consisting of:
      executing the purchase of the item; and
      forwarding relevant data to an online merchant to facilitate purchase of the item.

17. The computer program product of claim 10 further comprising:
   program code for forwarding the parental policy to an online merchant for enforcement.

18. The computer program product of claim 10 wherein the program code for receiving a parental policy indicating items prohibited for a child further comprises:
   program code for receiving a parental policy specifying item categories which are prohibited for the child.

19. A computer system configured to enforce a parental policy for online purchases, the computer system comprising:
   means for receiving a single parental policy indicating items prohibited for a child, said received single policy being automatically applicable to attempts to facilitate electronic purchases, from any source, using a single wish list, by any party, for the benefit of the child;
   means for receiving multiple attempts to facilitate individual purchases from multiple ones of a plurality of online merchants, using the single wish list, for the benefit of the child;
   means for, for each attempt to facilitate an individual purchase, 1) determining whether the purchase is permitted according to the policy, and 2) automatically affecting the attempt to facilitate the purchase responsive to results of the determining step; and
   means for, in response to determining that a specific attempt to facilitate an individual purchase of a specific item is not permitted according to the policy, 1) blocking the addition of the item to the wish list, and 2) transmitting a communication to the parent indicating that an unsuccessful attempt was made to add the item to the wish list.

20. The computer system of claim 19 wherein the means for receiving an attempt to make a purchase for the benefit of the child further comprise:
   means for receiving an attempt by the child to add an item to a wish list.

21. The computer system of claim 20 wherein the means for affecting the attempt to facilitate the purchase responsive to results of the determining step further comprise:
   means for determining that the attempt by the child to add the item to the wish list is not permitted according to the policy; and
   means for, responsive to the determination, performing at least one step from a group of steps consisting of:
   blocking the addition of the item to the wish list;
   blocking the wish list from exposing the entry of the item;
   transmitting a communication to the parent indicating that the child is attempting to add the item to the wish list;
   transmitting a communication to the parent requesting a parental directive as to a desired course of action; and
   responsive to receiving an indication from the parent indicating to override the policy, allowing the addition of the item to the wish list.

* * * * *